United States Patent [19]

Pollkötter

[11] Patent Number: 5,794,340

[45] Date of Patent: Aug. 18, 1998

[54] METHOD FOR THE MANUFACTURE OF A VEHICLE WHEEL

[75] Inventor: Günter Pollkötter, Beckum, Germany

[73] Assignee: Leico GmbH & Co. Werkzeugmaschinenbau, Ahlen, Germany

[21] Appl. No.: 832,358

[22] Filed: Apr. 2, 1997

[30] Foreign Application Priority Data

Apr. 19, 1996 [DE] Germany ............ 196 15 675.0

[51] Int. Cl.6 .................. B21K 1/32; B60B 3/10; B60B 21/00

[52] U.S. Cl. ............ 29/894.324; 72/71; 301/63.1; 301/96

[58] Field of Search .......... 29/894.323, 894.324, 29/894.325; 72/71, 84; 301/63.1, 95–98

[56] References Cited

U.S. PATENT DOCUMENTS

| | | | |
|---|---|---|---|
| 3,822,458 | 7/1974 | Schulte et al. | 29/894.324 |
| 4,388,817 | 6/1983 | Victor | 29/894.324 |
| 4,436,133 | 3/1984 | Rohr | 301/97 |
| 4,532,786 | 8/1985 | Schaible | 29/894.324 |
| 5,065,510 | 11/1991 | Ostermann et al. | 301/95 |
| 5,257,455 | 11/1993 | Iwatsuki | 29/894.323 |
| 5,271,663 | 12/1993 | Maidini et al. | 301/95 |
| 5,360,261 | 11/1994 | Archibald et al. | 301/63.1 |

*Primary Examiner*—P. W. Echols
*Attorney, Agent, or Firm*—Oblon, Spivak, McClelland, Maier & Neustadt, P.C.

[57] ABSTRACT

The invention relates to a method for the manufacture of a vehicle wheel with a wheel body and a rim having at least one undercut. In order to provide a simple, inexpensive method for the manufacture of a weight-reduced vehicle wheel, according to the invention the construction of an undercut in the rim area is integrated into the manufacture thereof by a spinning process. A cast preform having a clearly defined construction, is fixed in a spinning machine where initial preshaping takes place, a rim bed with an inside rim horn is formed and then by splitting and forming a rectangular flange cast radially onto the wheel body, the undercut and an outside rim horn are constructed. Following a heat treatment, machining is carried out for the final rim construction.

9 Claims, 2 Drawing Sheets

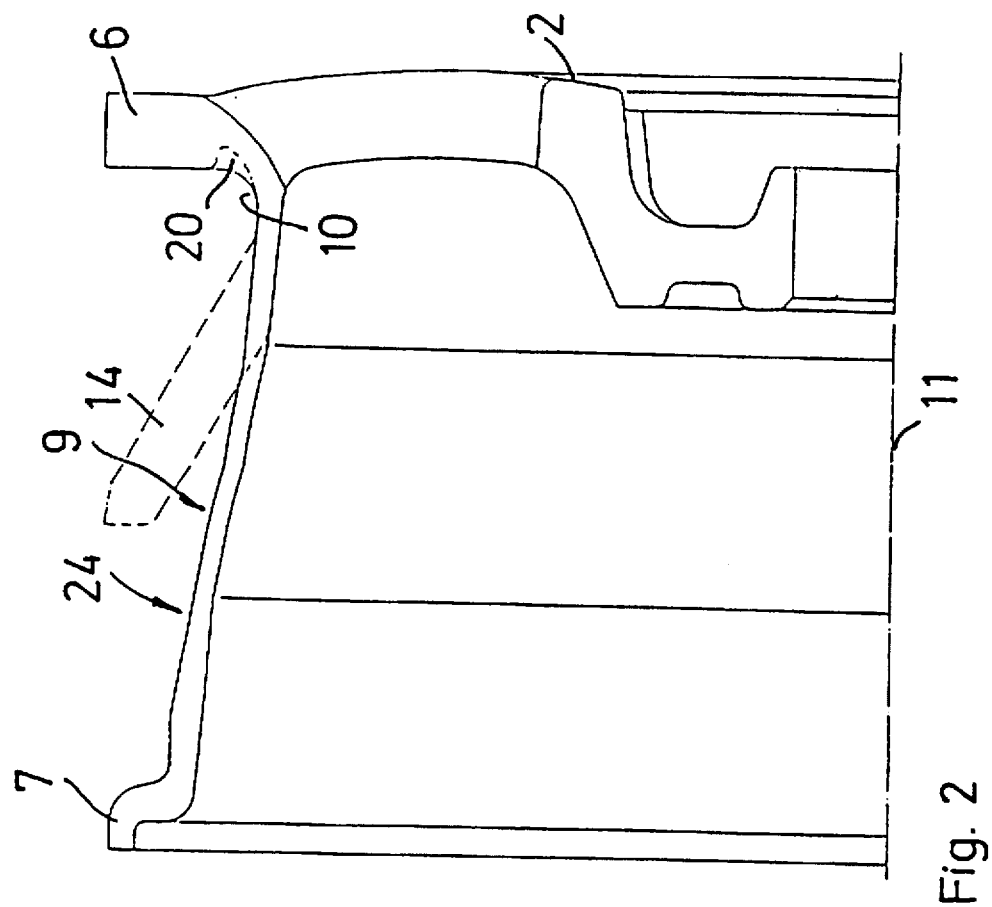
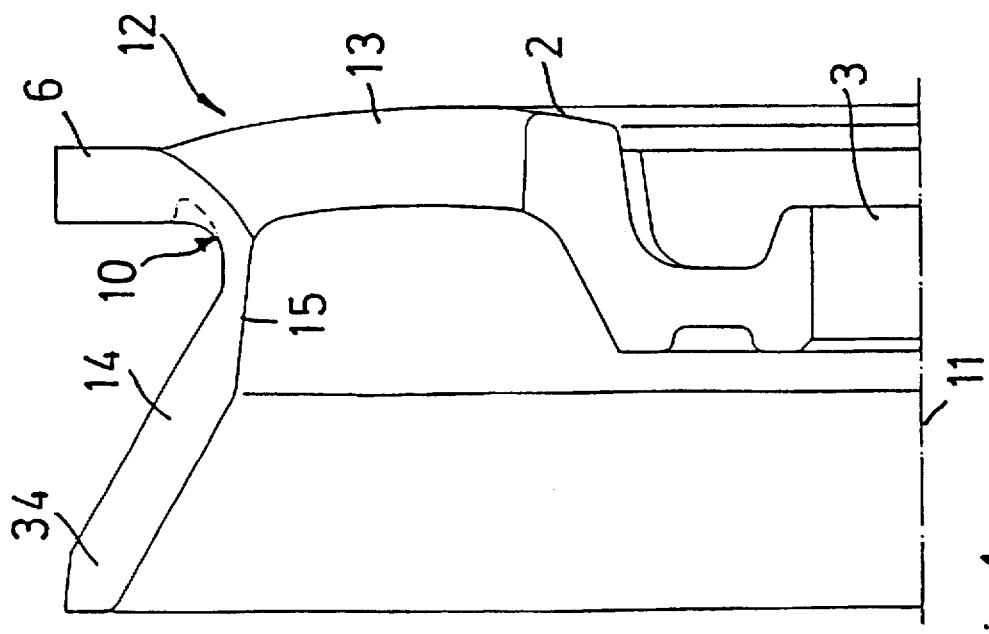

METHOD FOR THE MANUFACTURE OF A VEHICLE WHEEL

BACKGROUND OF THE INVENTION

The invention relates to a method for the manufacture of a vehicle wheel with a wheel body and a rim with at least one undercut, in which a preform with the wheel body and a radial flange, as well as a region coaxial to a centre axis of the preform are fixed in a spinning machine and the coaxial region is preshaped by spin rolling to a rim bed with an inside rim horn.

A vehicle wheel with an undercut in the vicinity of a rim is known from U.S. Pat. No. 5,360,261. The undercut, which can be constructed as a horizontal channel or troughs separated by radial webs, serves to reduce the weight of the vehicle wheel.

The relatively costly manufacture of the known vehicle wheel is disadvantageous. A wheel disk with the undercut structure is manufactured by casting and a rim by spin forming. The wheel disk and rim are subsequently interconnected at the intended connection areas by welding.

It is also known to manufacture vehicle wheels from a cup-shaped, cast preform already provided with a cast-on, outer rim horn, in that said preform is formed in a spinning machine by spinning rollers. Material savings can be achieved by spin forming. However, the weight reduction of a vehicle wheel does not fully meet the constantly increasing demands of vehicle operators.

SUMMARY OF THE INVENTION

The object of the invention is to provide a particularly simple and inexpensive method for the manufacture of a vehicle wheel, which simultaneously leads to a further weight reduction in the finished vehicle wheel.

According to the invention, this object is achieved by a method for the manufacture of a vehicle wheel with a wheel body and a rim having at least one undercut, in which the preform with the wheel body and a radial flange, as well as a region coaxial to a centre axis of the preform are fixed in a spinning machine and the coaxial region is preshaped by spinning rollers to a rim bed with an inside rim horn, which is characterized in that subsequently the radial flange is split by splitting rolls into an inner leg and an outer leg and, accompanied by the formation of the undercut, the inner leg is preshaped to a rim shoulder and the outer leg to an outer rim horn and subsequently there is an end profiling of the preshaped rim bed, the inside and outside rim horns and the rim shoulder above the undercut to the rim by machining.

The invention is based on the idea of integrating the construction of an undercut in the rim region into spinning processes for the manufacture of a one-piece vehicle wheel. In combination with a specifically constructed preform, which has a radial flange on the outer circumference of a wheel body and a coaxial region starting from a specifically constructed corner or connecting region between the wheel body and the radial flange, a material-saving and weight-reducing undercut is constructed by splitting and spin forming the radial flange.

According to the invention, prior to the splitting of the radial flange, with the aid of a radially infeedable splitting roll, a rim bed with an inside rim horn is at least preshaped and e.g. the sought gap width and gap depth of the rim and the horn width and horn height and a rim shoulder are obtained. This preshaping takes place in a spinning machine and advantageously in a setting, which can also be used for the subsequent splitting process. This leads to a particularly favourable manufacturing time. In addition, with only one setting, the probability of dimensional variations is extremely small. Another advantage is that both the spinning roller and the following splitting roll can be radially infed.

Appropriately the radial flange is cross-sectionally rectangular and cast onto the wheel body in an edgewise arrangement.

The method is particularly suitable for the construction of asymmetrical wheels, which have a long wheel side, namely the rim bed and a rim shoulder, particularly with a hump, as well as an inside rim horn, and a short wheel side with an outside rim horn and the inventively manufacturable undercut in the area between the outside rim horn and the rim bed or the circumferential area of the wheel body.

Another advantage of the method according to the invention is that as a result of spin forming in the vicinity of the so-called short wheel side, i.e. the outside rim horn and a rim shoulder, as well as the corner region and undercut, there is an improvement to the material structure. This permits a subsequent working, particularly a final machining, which can be performed after a heat treatment for inside and outside end profiling. In the known method, in which a cast preform with a finished, short wheel side is used, such material structure improvements are not attainable and machining is impossible.

Prior to calibration or finish turning of the vehicle wheel, it is appropriate to carry out a heat treatment. As a result the following finish turning of the vehicle wheel can be performed protectively and with much lower forces and therefore without any possible disadvantageous structural changes. It is important that the material structure is made more homogeneous due to the preceding spin forming and is more stable in the vicinity of the undercut.

DESCRIPTION OF THE DRAWINGS

The invention is described in greater detail hereinafter relative to the highly diagrammatic drawings, wherein show:

FIG. 1 A vertical partial section through a cast preform used as a basis for the method according to the invention.

FIG. 2 A vertical partial section through a vehicle wheel to be manufactured following forming by means of spinning rollers for the construction of a preshaped rim bed with inside rim horn.

DETAILED DESCRIPTION OF THE PREFERRED EMBODIMENT

Figure 3:
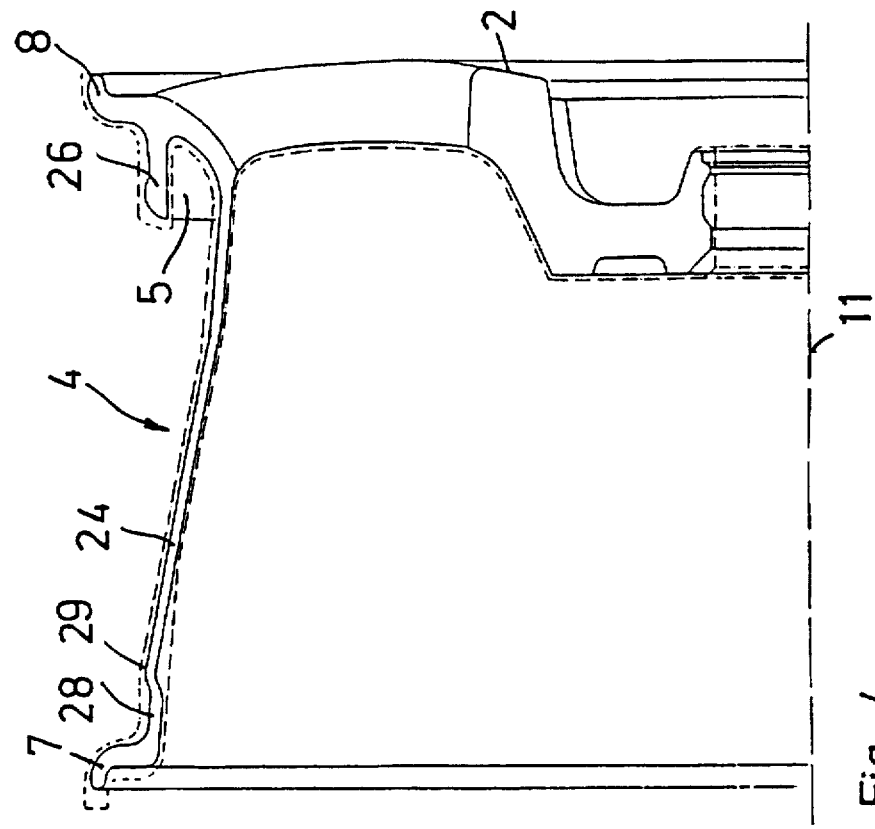
FIG. 3 A vertical partial section through a vehicle wheel to be manufactured after a splitting and forming process for the formation of an undercut and an outside rim horn.

The method for the manufacture of a vehicle wheel according to the invention uses, according to FIG. 1, a cast preform 12, e.g. of a light metal alloy. FIG. 1 and the further FIGS. 2 to 4 only show one half above a centre axis 11 of the rotationally symmetrical body.

The cast preform 12 has a finished wheel body 2, which is fundamentally radial and has a centre bore 3 and regularly constructed openings 13. Cast preform 12 includes a radially outwardly projecting flange 6, which essentially has a rectangular cross-section, the rectangle being formed in an edgewise arrangement. In the transition area between the wheel body 2 and the radial flange 6 an area 14 is constructed coaxially to the centre axis 11 and is virtually conical towards a free end 34. The coaxial area 14 and the radial flange 6 enclose a corner region 10, whose construction essentially defines the undercut 5 to be produced (cf. FIGS. 3 and 4). An inner wall 15 of the coaxial area 14 directed towards the centre axis 11 has a construction which, like the wheel body 2, corresponds to the finished vehicle wheel.

Figure 4:
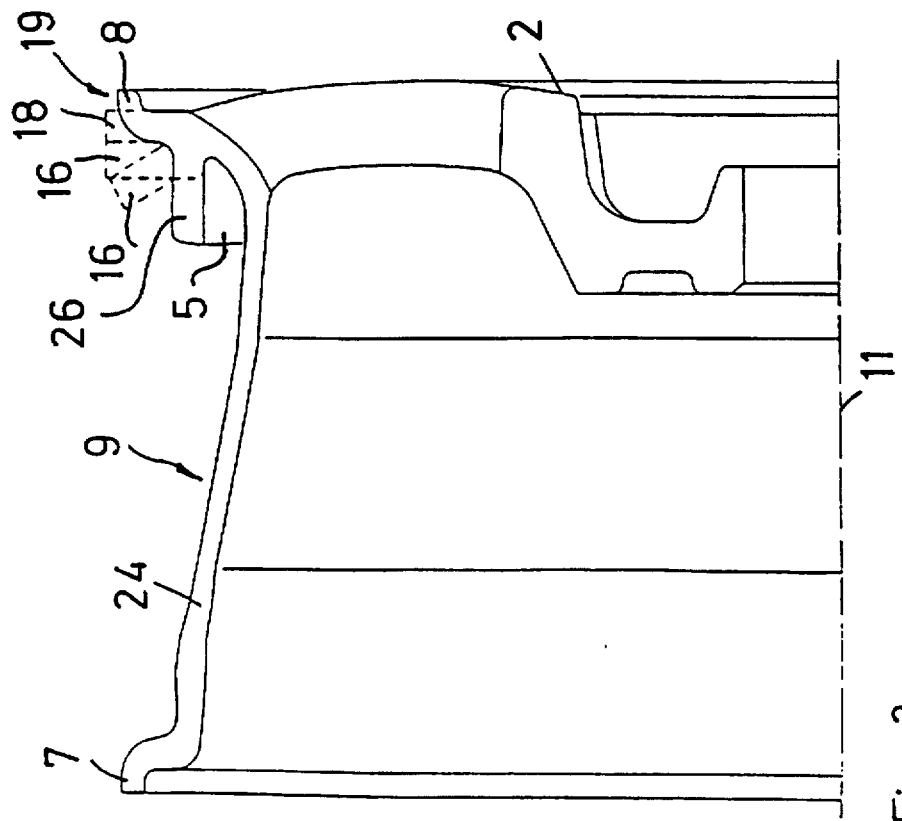
FIG. 4 A vertical partial section through a vehicle wheel manufactured according to the invention with a completely shaped rim and undercut.

The wall thicknesses and lengths of the radial flange 6 and the coaxial area 14 are so dimensioned that the resulting material accumulation is suitable for the desired construction of a rim 4 (cf. FIG. 4).

FIG. 2 shows with broken lines the coaxial area 14. The continuous lines indicate a rim bed 24 with an inside rim horn 7 in a pre-shaped construction. The forming of the coaxial area 14 in the preshaped rim bed 24 and the pre-shaped inner rim horn 7 takes place in a spinning device with the aid of radially settable spinning rollers (not shown) and in particular under the action of heat. The rim bed 24 with inside rim horn 7 can also be referred to as a long wheel side 9 as opposed to a short wheel side 19 (cf. FIGS. 3 and 4). A channel or recess 20 in the corner region 10 is indicated in dot-dash line form and can optionally be produced by machining or spinning the radial flange 6 in said region following the preshaping of the rim bed and prior to the splitting of the radial flange. By means of such a channel a further weight reduction is achieved, which is particularly advantageous.

The long wheel side 9 is only preshaped by spinning rollers according to FIG. 2, whilst FIG. 4 shows an end profiling or finish turning.

FIG. 3 shows the construction of an undercut 5 in a spinning machine, in that at least one not shown splitting roll acts on the radial flange 6. As shown by the dot-dash and broken lines of the radial flange 6, the latter is radially split, leading to the formation of an inner leg 16 and an outer leg 18. Both legs 16, 18 are mainly symmetrically constructed, so that the splitting process can be particularly accurately performed. A continuous line shows an outside rim horn 8 and a rim shoulder 26, which are formed by spinning rolls from the outer leg 18 and the inner leg 16. The outside rim horn 18 is bent outwards, whilst the rim shoulder 26 is substantially horizontal and axially parallel to the centre axis 11. In the vicinity of said rim shoulder 26 is located the tyre with a tyre bead. FIG. 3 clearly shows the construction of the undercut 5 and the resulting material saving and weight reduction.

FIG. 4 shows a finish turned vehicle wheel. The contours of the rim bed 24, an inside rim shoulder 28, a hump 29, the inside rim horn 7 and the rim shoulder 26 in the vicinity of the outside rim horn 8, as well as the undercut 5 are standardized and are obtained by machining.

I claim:

1. A method for the manufacture of a vehicle wheel wherein a cast preform with a wheel body, a radial flange and a coaxial region is formed into a wheel body and a rim having at least one undercut and an outer and inner rim horn, comprising the steps of:

preshaping the coaxial region into a rim bed with an inside horn, wherein said preshaping is performed with spinning rollers;

splitting the radial flange into an inner leg and an outer leg;

preshaping the inner leg into a rim shoulder thereby forming the at least one undercut;

preshaping the outer leg into an outer rim horn; and, machining the rim bed, the outer rim horn, the inner rim horn and the rim shoulder to achieve the respective final profiles.

2. The method according claim 1, further comprising the step of additionally recessing a corner region following the preshaping of the rim bed and prior to the splitting of the radial flange.

3. Method according to claim 1, characterized in that the radial flange has a substantially rectangular cross-section.

4. Method according to claim 1, characterized in that the plane of the radial flange included on the cast preform, is perpendicular to the axis of the wheel body.

5. Method according to claim 1, wherein said step of splitting the radial flange further comprises splitting the radial flange into the inner leg and outer leg by a radially infeedable splitting roll such that said legs are substantially symmetrically constructed.

6. Method according to claim 5, characterized in that the steps of preshaping the coaxial region into a rim bed, splitting the radial flange, preshaping the inner leg, and preshaping the outer leg are performed in one spinning machine setting.

7. Method according to claim 1, characterized in that the cast preform includes a recessed corner region formed between the radial flange and the coaxial region.

8. Method according to claim 1, wherein the cast preform is constructed of a light metal alloy.

9. Method according to claim 8, wherein the cast preform is constructed of an aluminum alloy.

* * * * *